United States Patent [19]

Simonoff

[11] Patent Number: 5,347,302
[45] Date of Patent: Sep. 13, 1994

US005347302A

[54] METHOD FOR MICR ENCODING OF CHECKS USING LASER PRINTERS AND CONFIRMATION OF MICR POSITIONING

[76] Inventor: Jerome Simonoff, 65 Cornell Dr., Plainview, N.Y. 11803

[21] Appl. No.: 51,844

[22] Filed: Apr. 26, 1993

[51] Int. Cl.$^5$ .................. G01D 15/06; G03G 21/00
[52] U.S. Cl. .................. 346/153.1; 395/117; 355/218
[58] Field of Search .................. 346/153.1; 355/218; 395/117

[56] References Cited

U.S. PATENT DOCUMENTS

| 5,030,977 | 7/1991 | Hanson et al. | 346/160 |
| 5,075,875 | 12/1991 | Love et al. | 395/117 |
| 5,121,945 | 6/1992 | Thomson et al. | 283/58 |
| 5,291,243 | 3/1994 | Heckman et al. | 346/157 X |

*Primary Examiner*—George H. Miller, Jr.
*Attorney, Agent, or Firm*—Ernest F. Weinberger

[57] ABSTRACT

An improved method for accurately and correctly laser imprinting a blank check form with MICR information. The method also provides for visual confirmation that the MICR information is properly positioned on the laser printed check. The steps of a suitable method comprise: (a) providing a press printed blank check sheet which includes a line of horizontal tear perforations and printed text characters; (b) laser printing under the control of a computer program on the pre-printed blank check with magnetic ink in MICR font a pair of indices of registration, MICR information in the "clear band" area of the blank check and other text necessary to complete the check. The indices of registration may include horizontal bracket lines for straddling the perforations and a rectangular box for enclosing selected preprinted text. If the laser printed bracket lines do in fact straddle the perforations and the printed box properly encloses the selected text then the printed MICR information is correctly positioned.

14 Claims, 2 Drawing Sheets

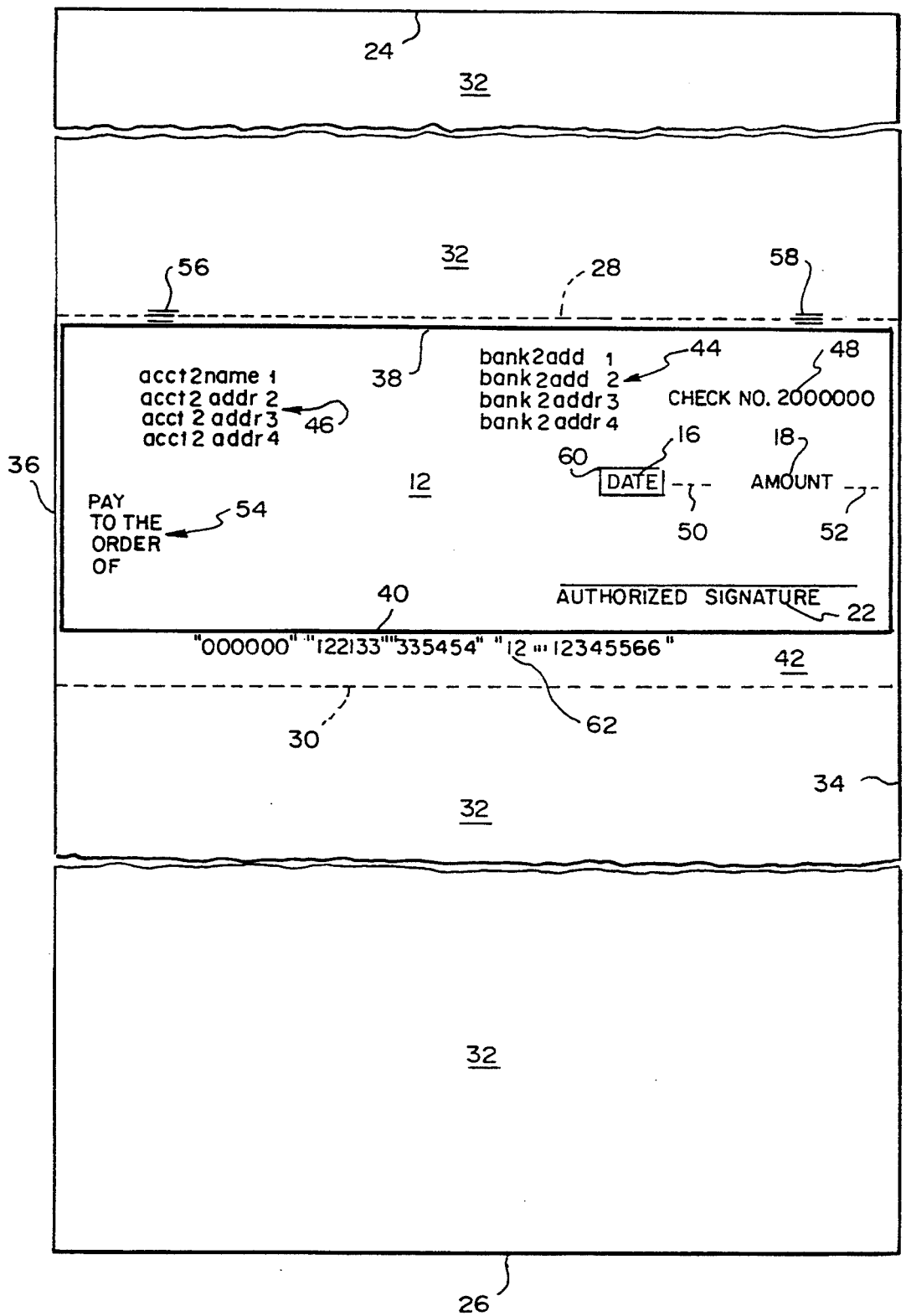

METHOD FOR MICR ENCODING OF CHECKS USING LASER PRINTERS AND CONFIRMATION OF MICR POSITIONING

CROSS-REFERENCE TO RELATED APPLICATIONS

There are no related applications.

STATEMENTS AS TO RIGHTS TO INVENTION MADE UNDER FEDERALLY SPONSORED RESEARCH AND DEVELOPMENT

The invention disclosed and claimed herein was not made under any federally sponsored research and development program,

BACKGROUND OF THE INVENTION

1. Field of the Invention

The present invention relates generally to imprinting data on documents and more particularly pertains to encoding checks with a series of properly positioned magnetic ink characters.

2. Description of the Prior Art

In the past both personal and business checks have been produced by printing presses and the like. Such checks, on their face, include at the least all the necessary information pertaining to the issuing bank and the drawer of the check. In addition, the check also bears a series of magnetic ink characters identifying the issuing bank and the drawer and other information for later processing of the check by banks and the Federal Reserve System. The magnetic ink characters must be located within a specific area on the check.

Printed checks as described above are generally produced in large quantities in order to lower the unit cost. This, however, restricts any run of checks to a specific bank, one drawer and account (number). Therefore, the drawer can only issue checks on one bank and one account for each series of checks printed. In order to issue checks on multiple banks or accounts it is necessary to have specific checks printed for each variation. Since business organizations operate under multiple styles and maintain various accounts at different banks they must, of necessity, stock a plurality of check forms. This is both costly and time consuming.

Checks and other similar commercial documents are required to meet and conform to certain standards. One such standard is Standard X9.27 entitled "Print Specifications for Magnetic Ink Character Recognition" and referred to as "MICR". This standard is issued by the Accredited Standards Committee on Financial Services under the procedures of the American National Standards Institute and published by the X9 Secretariat of the American Bankers Association. The specification sets forth the specific type fonts and special toners that must be used in the printing of these documents. Specification X9.13 entitled "American National Specifications for Placement and Location of MICR Printing" imposes stringent requirements for the placement of the MICR characters on checks. This specification delineates the very precise positioning of the MICR print characters relative to the edges of the check form. The specification also prohibits magnetic printing other than MICR characters within the character recognition reading area. The reading area is defined as a "Clear Band (MICR) A Band 0.625 inch high, measured from the aligning edge of the document, parallel to that edge and extending the length of the document. It is reserved for imprinting of MICR characters."

Although commercially printed check forms, which include MICR characters, are printed by machines that exhibit relatively accurate edge alignment, such printed documents nevertheless require examination. In order to insure that the imprinted images are properly aligned, testing services are available from companies which specialize in determining whether the check forms conform to the foregoing standards and specifications. Since mechanical as well as other printers are subject to alignment errors due to environmental or handling factors, frequent tests must be performed to determine compliance with specifications. The printed check forms can still fail to meet the specifications between compliance tests.

Recent technology has made available computer driven laser printers which are capable of printing special type font characters in magnetic ink using special toners. Such printing will meet the X9.27 standard. Commonly available sheet fed laser printers employ rather crude friction rollers for inserting and feeding paper through the print imaging portions of the printer. Therefore, these laser printers do not provide accurate sheet registration and therefore can not provide precise spatial registration of printed images with respect to the edges of a sheet of paper. Presently marketed laser printers produce high quality graphics without any noticeable distortion because they print using dots with extremely close spatial relationships to other dots on the same sheet. Therefore, laser printers are capable of extreme accuracy in the placement of images with respect to other images printed on the same sheet during the same operation.

SUMMARY OF THE INVENTION

The present invention comprises a method of accurately printing and properly positioning specific magnetic ink characters on the face of a blank check with a laser printer. In addition, the method of the present invention provides, by simple visual inspection of the laser printed check, confirmation as to whether the magnetic ink characters are properly positioned and conform to the required standards.

The method of the present invention includes initially providing a pre-printed blank check form having one or more horizontal and/or vertical indicator base marks which may include, for example, (a) an encircling configuration such as a rectangular box defined by a pair of vertical and horizontal lines border lines, (b) printed text and (c) horizontal perforations cut during printing of the blank check form. Next laser printing with magnetic ink on said blank check form one or more horizontal indicia of registration proximate said horizontal indicator base marks and printing a vertical spatial indicia of registration proximate said vertical indicator base marks as, for example, enclosing a selected portion or portions of the blank check form defined by pre-printed text character or series of characters thereon. And finally, causing said laser printer, in the same printing operation, to print at a specific location relative to said indicator base mark selected MICR characters. Said specific location being defined by MICR specifications, for the printing of MICR characters. Thereafter the completed printed check can be visually examined and for example if the printed horizontal indicia of registration are parallel to the pre-printed horizontal indicator base marks and the enclosing indicia of registration accurately encloses said preprinted text character or characters then the MICR printed characters are located in positions conforming to specification.

Accordingly, it is an object of this invention to provide an improved method for imprinting a preprinted check or similar document with magnetic ink in conformance with MICR standards using a laser printer.

Another object of this invention is to provide a method which results in the reliable placement of the MICR on a check.

Still another object is to provide an improved method for magnetic ink printing of a check whereby the printed check can be visually examined so as to confirm adherence to MICR positioning.

A further object of the present invention is to provide a reliable, positive and low cost method for imprinting a preprinted check or the like with magnetic ink using a laser printer wherein the resulting check can be visually examined as to whether the MICR imprinting location conforms to the MICR standards.

Other objects and many of the attendant advantages of this invention will be readily appreciated as the same becomes better understood by reference to the following detailed description when considered in connection with the accompanying drawings in which like references numerals designate like parts throughout the figures thereof.

BRIEF DESCRIPTION OF THE DRAWINGS

FIG. 2 is a representation of the check of FIG. 1 after the method according to the present invention has been applied thereto.

DETAILED DESCRIPTION OF THE PREFERRED METHOD

Figure 1:
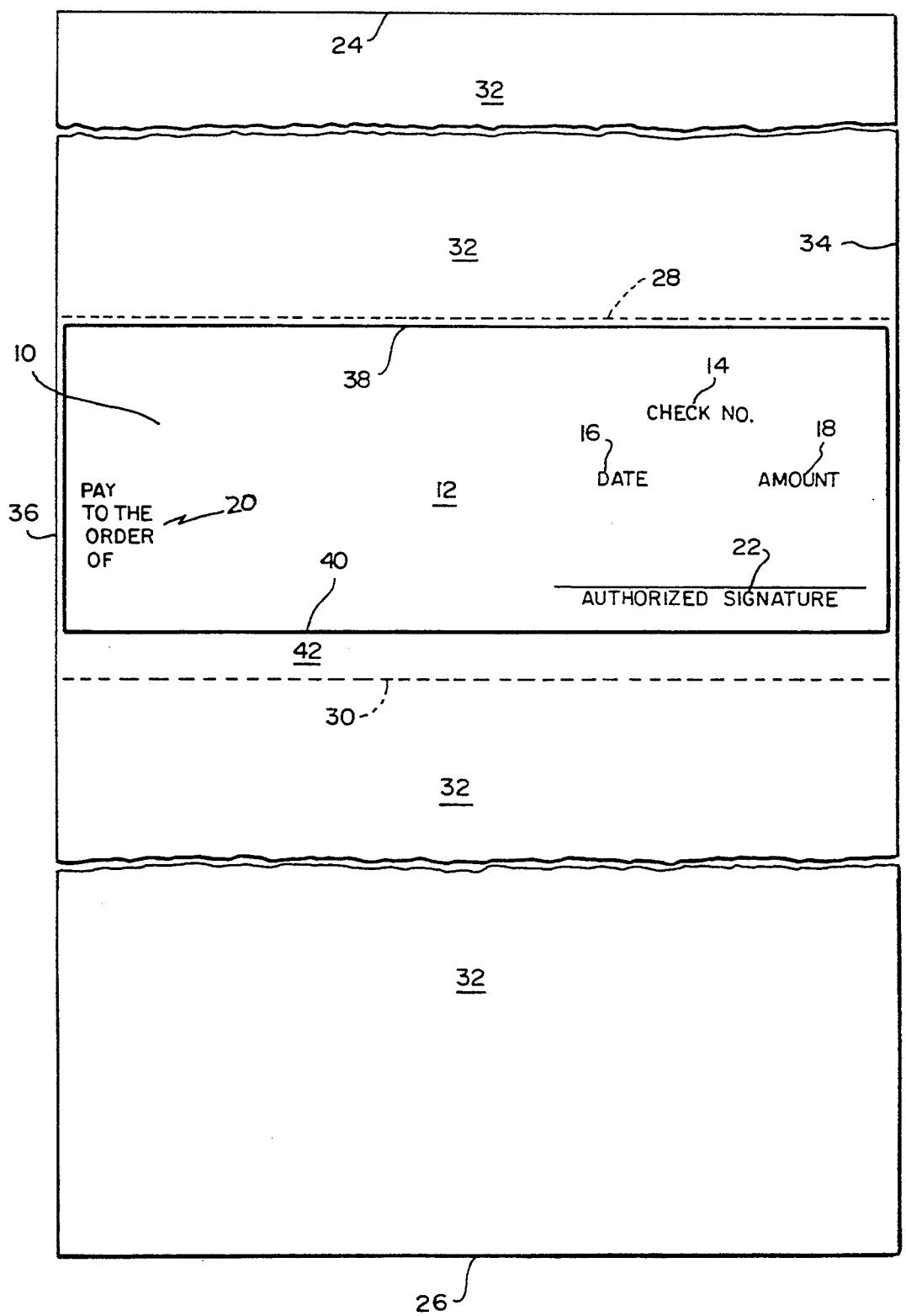
FIG. 1 is a representation of a preprinted check suitable for the practice of the method of this invention.

The illustrated preprinted blank check (form) 10 of FIG. 1 is one of many check forms suitable for use in practicing the subject invention. The check face need only contain a minimum amount of printed text along with a printed screen-like image to represent the check face 12. The printed text may include one or more of the following: CHECK NO.(14); DATE (16); AMOUNT (be); PAY TO THE ORDER OF (20); and a SIGNATURE line (22). The check text however, should not include the name of the bank on which the check is to be drawn; the account name (drawer); the account number or any MICR information. The blank check 10 was printed by a printing press or any such other device which can maintain extremely accurate spatial and alignment relationships between portions of the printed image perforations and paper edges. For example, upper and lower sheet edges 24 and 26 and the linear perforations 28 and 30 which were cut into the paper sheet 32 during the printing process. Preferably these perforations 28 and 30 should be perpendicularly aligned with the side edges 34 and 36 of the sheet 32. In addition, it is desirable to cut the perforations 28 and 30 so that they are co-linear with the horizontal upper and lower check border lines 38 and 40 which in turn, are all parallel to the sheet paper edges 24 and 26.

The preprinted blank check 10 is printed with non-magnetic ink. It does, however, include one or more printed indicator or indicia base marks which are printed in non-magnetic ink and located on some portion of the blank check form disposed between the upper perforation 28 and the lower check border line 40 but outside of the "CLEAR BAND" 42. These indicia base marks may include the upper perforation 28, one or more text characters or portions of the printed text enumerated above. Since the printing press process provides excellent sheet edge registration it therefore also maintains an accurate printed spatial relationship between the image printed matter and such paper sheet edges.

After the blank check of FIG. 1, as described above, has been printed on paper sheets 32 the paper sheets can be loaded in the paper tray or holder of a laser printer. The laser printer operation is under the control of a computer which receives its input from, for example, an operator. The laser printer has been equipped with MICR magnetic toner and the MICR character font has been installed therein. The control computer has been programmed to automatically cause the laser printer to imprint on the paper sheet one or more indices of registration. For example, but without limitation, such indices of registration, may include one or more spaced apart bracket lines, and or closed rectangular boxes. Correct placement of at least two of these indices of registration will insure against skew and the correct location of both text and MICR information.

Reference is now made to FIG. 2. Under the input of an operator the laser printer is caused to print on the blank check face 12 the selected bank identification 44, the selected account name 46, the next consecutive check number 48, the date 50, the check draw amount 52, and the payee 54. During the same printing operation the computer program automatically causes the laser printer to print at least two of the indices of registration in addition to printing the MICR information in the "Clear Band" area 42. In this case the first indicia of registration consists of left and right bracket lines 56 and 58 which are intended to closely straddle the line of upper base mark perforation 28 in a location proximate the sheet side edges 34 and 36. The second indicia of registration consists of the rectangular box 60 closely enclosing the base mark represented by the series of text characters which spell "DATE". Any other preprinted base marks such as an individual or a series of text characters could be enclosed by a similar rectangular box of the proper size. Such text could include "AMOUNT", "CHECK NO." and "PAY TO THE ORDER OF".

In view of the fact that laser printers are capable of accurately printing and placing images with respect to each other, it is clear that if a first image is accurately positioned when printed then a second image printed therewith will be accurately located with respect to the first image. If the laser printing is not skewed with respect to the sheet on which the check form was preprinted and if the first image is properly located then the second image will likewise be accurately positioned.

With foregoing in mind and still referring to FIG. 2, it is clear that if visual observation shows that the perforation 28 is straddled by bracket lines 56 and 58 and box 60 properly encloses the text characters "DATE" then the MICR information 62 has been printed in compliance with the required specifications. The location of the information in the "Clear Band" is determined by the computer program with respect to one or more of the indices of registration.

In summary, the computer program that directs the laser printer which, is equipped with MICR toner and print fonts, to print the bank, account number and MICR information on special check forms it will also print a box or boxes enclosing preprinted indicators: or print an indicator within a preprinted box and/or any encircling configuration; or print registration marks bracketing a preprinted line or a print cut perforation. The boxes are dimensioned slightly larger than the indicator which they enclose to allow for tolerances in MICR placement as delineated in the X9.13 specification. A combination of two of the foregoing registration criteria has been found to provide satisfactory results and insure against skew. Since the laser printer is using MICR active magnetic toner, the above identified registration marks must be printed outside of the "Clear Band". A mark falling anywhere inside the box will insure compliance. Conversely, a mark or a portion thereof falling outside the box, indicates non-compliance.

Since the placement of the indicator(s) and/or box(es) is printed by the laser printer at the same time as the MICR characters, extremely close tolerances can be assumed in the relationship between the generated registration marks and the MICR check codes. Therefore if the registration marks are properly positioned the user can be assured that the MICR information is likewise properly positioned. With the use of the boxes, marks and indicators it is extremely easy to verify that the location of the MICR information is within tolerances set by the specification. Thus, the final printed checks can be visually inspected by any clerical personnel prior to issuance obviating the need for frequent testing.

Obviously many modifications and variations of the present invention are possible in the light of the above teachings. It is therefore understood that, within the scope of the appended claims, the invention may be practiced otherwise than specifically described.

Having thus described the invention, what is claimed as novel and desired to secure by Letters Patent is:

1. A method for the laser printing of additional information on a preprinted paper sheet having thereon a blank check form for permitting subsequent visual confirmation of registration and proper placement of said information on said check form which method, comprises the steps of:
   providing a paper sheet having preprinted thereon an aligned blank check form, which sheet, includes at least two separate indicator base marks and a clear band area,
   laser printing on said paper sheet at least two indices of registration associated with said at least two indicator base marks and also printing selected additional information, using magnetic toner and an MICR character font,
   whereby proper alignment and location of the printed additional information can be confirmed by visually observing the spatial relationship between said indicator base marks and said indices of registration.

2. The method according to claim 1 wherein said additional information includes the proper MICR code.

3. The method according to claim 1 wherein one of said two indicator base marks is a horizontally aligned line of perforations cut into said paper sheet and the indicia of registration associated therewith is a pair of bracket lines straddling said line of perforations.

4. The method according to claim 3 wherein said line of perforations is disposed on the side of the blank check form opposite said clear band area.

5. The method according to claim 1 wherein one of said two indicator marks comprises one or more preprinted text characters and the indicia of registration associated therewith is a rectangular box enclosing said one or more preprinted text characters.

6. The method according to claim 1 wherein one of said two indicator marks comprises a preprinted encircling configuration and the indicia of registration associated therewith comprises one or more text characters laser printed within said configuration.

7. The method according to claim 1 wherein said step of laser printing is computer controlled.

8. The method according to claim 7 wherein said preprinted paper sheet is printed on a printing press.

9. A method employing a laser printer to encode preprinted check forms with MICR code at the correct location which method comprises the steps of:
   printing a blank check form having imprinted thereon a pair of indicator base marks and including a "clear band" area; and
   laser printing in magnetic ink on said blank check form a pair of indices of registration for association with said indicator base marks and encoding in magnetic ink and in MICR font thereon said MICR information,
   whereby it can be visually determined whether the indices of registration and the indicator base marks are correctly associated and if so the laser printed MICR information is properly located.

10. The method according to claim 9 wherein said laser printing is computer controlled.

11. The method according to claim 9 wherein one of said indicator base marks is a horizontal line of perforations and the associated indicia of registration is a pair of bracket lines for straddling said line of perforations.

12. The method according to claim 11 wherein one of said indicator base marks is a series of one or more text characters and the associated indicia of registration is an enclosing configuration for enclosing said text characters.

13. The method according to claim 12 wherein said enclosing configuration is a rectangular box.

14. The method according to claim 9 wherein one of said indicator base marks is a printed horizontal line and the associated indicia of registration is a pair of bracket lines for straddling said printed line.

* * * * *